United States Patent
Timmerman

(10) Patent No.: US 7,793,343 B2
(45) Date of Patent: Sep. 7, 2010

(54) METHOD AND SYSTEM FOR IDENTITY MANAGEMENT INTEGRATION

(75) Inventor: Christopher Randolph Timmerman, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 1183 days.

(21) Appl. No.: 11/367,515

(22) Filed: Mar. 3, 2006

(65) Prior Publication Data

US 2007/0209066 A1 Sep. 6, 2007

(51) Int. Cl.
*G06F 15/16* (2006.01)
(52) U.S. Cl. .............................. 726/8; 726/1; 713/182; 380/279; 709/209; 709/223
(58) Field of Classification Search ...................... 726/2, 726/3, 4, 5, 6, 8, 9, 17, 1; 713/155, 182; 380/279; 709/209, 223
See application file for complete search history.

(56) References Cited

U.S. PATENT DOCUMENTS

| | | | |
|---|---|---|---|
| 5,768,503 A * | 6/1998 | Olkin | 726/5 |
| 6,178,511 B1 * | 1/2001 | Cohen et al. | 726/6 |
| 6,240,512 B1 * | 5/2001 | Fang et al. | 713/150 |
| 6,275,944 B1 * | 8/2001 | Kao et al. | 726/36 |
| 7,249,375 B2 * | 7/2007 | Bhatia et al. | 726/8 |
| 2003/0163733 A1 * | 8/2003 | Barriga-Caceres et al. | 713/201 |
| 2004/0230831 A1 * | 11/2004 | Spelman et al. | 713/201 |
| 2005/0074126 A1 * | 4/2005 | Stanko | 380/279 |
| 2006/0271689 A1 * | 11/2006 | Kikuchi | 709/227 |

\* cited by examiner

*Primary Examiner*—Thanhnga B Truong
(74) *Attorney, Agent, or Firm*—Osha • Liang LLP

(57) ABSTRACT

A method and system for a vendor-neutral method of integrating single sign on functionality with the features of a robust identity management application in a cost effective, reliable and timely manner is disclosed. A user accesses the system through a commercially-available single sign on application. When a user requests to be logged in to one or more applications, the request is not sent to a custom business logic layer as known in the art but, instead, is directed to an intermediary application which takes action depending on the nature of the user's login information. The intermediary application serves as the interface between the single sign on application and the identity management system. The intermediary application contains a work flow or business process engine and a method for mapping the business logic. Information flows seamlessly between the single sign on application and the identity management system without regard to either products' platform or vendor.

15 Claims, 3 Drawing Sheets

METHOD AND SYSTEM FOR IDENTITY MANAGEMENT INTEGRATION

FIELD

The present invention relates to computer networks and, more particularly, to a method and system for integrating single sign on applications with identity management applications in a manner that is platform and application independent.

BACKGROUND

Enterprises today are in need of improved methods for managing user authentication and access. User authentication is the process whereby a first party's computer, computer program, or user attempts to confirm that a second computer, computer program or user from whom the first party has received a communication is the claimed second party. The process typically involves the authentication of the user's identity, which can be a password, account name, personal identification number, biometric identifier, permission level or other attribute identifying or pertaining to the user in some manner.

Historically, each application used a common security infrastructure. As a result, a user desiring access to multiple applications was required to provide multiple passwords which was both time intensive and unreliable. The solution was to develop a common enterprise security infrastructure to replace the heterogeneous infrastructure. One method of streamlining the authentication process is through single sign on (SSO), sometimes called "reduced sign on," applications. These applications provide security and administrative management for Web applications with a centralized security infrastructure for managing user authentication and access. More specifically, SSO applications capture identification and authentication information once, and provide it to systems accessed by a user automatically. The objective of single sign-on systems is to reduce the user's number of different authenticators and to reduce the frequency with which the user must provide those authenticators to systems.

There are numerous benefits to implementing an SSO application. For the user, the benefits include the fact that there is only one authentication mechanism to remember and update, and one set of authentication rules. For the system administrators, the benefits include the fact that there is a single common registry of user information, a single method for managing user information, and a single security infrastructure. Finally, there is a benefit to the enterprise in the form of enhanced security because there is a single secure infrastructure leveraged throughout the enterprise that can be closely monitored and managed.

There are a number of different types of SSO applications in use today, including both those based on proprietary security systems and those based on recognized security standards. Proprietary systems were the first developed. In one of the earliest application, called an enterprise single sign on (also called a legacy single sign on) application, the application intercepts login prompts presented by secondary applications after the user is authenticated. The application then automatically fills in fields, such as a login ID or password, in the secondary applications. These products typically use some proprietary authentication mechanism and then reauthenticate transparently to multiple underlying systems through the user interfaces to those systems. This typically involves a scripting engine that drives the interaction with each underlying system's authentication mechanism. The scripting engine simulates a user logging in, so the underlying systems do not need to be changed. User names, passwords, and system information are stored in an SSO database.

The SSO database must follow all password rules for all enterprise systems and it must be updated whenever underlying passwords are changed. In addition, if the system or systems use other authentication mechanisms, such as certificates, challenge-response, or SecureID cards, those must be accommodated as well.

An alternative to enterprise single sign on is Web single sign-on works strictly with applications and resources accessed with a Web browser. In this application, access to Web resources is intercepted, either using a web proxy server or by installing a component on each targeted web server. Unauthenticated users who attempt to access a resource are diverted to an authentication service, and returned only after a successful sign-on. It is common to use cookies to track the user's authentication state, and the Web single sign on application extracts user identification information from these cookies, passing it into each Web resource.

As previously mentioned, there are a number of single sign on applications based on recognized standards such as Kerberos, Distributed Computing Environment, Microsoft ActiveDirectory and related technologies, and public key infrastructure. By way of example, Kerberos externalizes authentication entirely. The user signs into the Kerberos server and is issued a ticket which the client software presents to servers that the user attempts to access. Kerberos is available on Unix, Windows and mainframe platforms, but requires extensive modification of client/server application code, and is consequently not used by many legacy applications.

Finally, a number of SSO applications have been built on top of a common registry. Of course, using a common registry requires that all existing applications be migrated to use this new registry and that some department or external organization must manage this critical business system. In general, the best registry to choose is one that supports Lightweight Directory Access Protocol (LDAP). There are a number of LDAP server products, and most security and middleware products that support secure access can use an LDAP directory for authentication. Once an enterprise embarks on this effort, they may find that many applications can switch easily to LDAP simply by reconfiguring the middleware that they use. For example, Netscape Enterprise Server, Apache, IBM HTTP Server, AIX, Solaris, and WebSphere Application Server already support LDAP out of the box. Additionally, Microsoft ActiveDirectory can provide LDAP services to other clients.

The task of configuring an SSO system for a large enterprise with numerous existing systems can be substantial. Custom scripts must be developed for each user authentication interaction. With respect to only UNIX utilities, the list includes telnet, ftp, rsh, and rlogin. It is easy to see why, when this list is added to the lists of utilities for other operating systems, custom applications, and Web sites, the task of creating scripts, much less managing them, grows dramatically. In addition, these proprietary and standards-based solutions do not interoperate seamlessly. Accordingly, they cannot be applied to every system. The result is a complex system of integrating user authentications which leads to a costly solution for the enterprise.

Another problem inherent in SSO applications is the absence of password management features, such as the ability to lock, unlock, enable, and disable end user accounts. Because these are not part of the LDAP standard, password management features are not automatically incorporated into most SSO applications. Password management features are sometimes incorporated into SSO applications on a custom basis. Consequently, these features become proprietary to the SSO vendor and cannot be ported to other vendors' application.

Enterprises interested in robust password management features typically look to existing identity management application, such as Sun Microsystems' Identity Manager. These types of products provide a foundation for building reusable business processes for managing user data. They can be invoked by multiple actors in the system and provide a single source for password management across the enterprise. For example, many of these applications provide automated identity management services (creation, modification, and eventual deletion or suspension of user accounts and entitlements) for enterprise systems based upon the user's relationship with the firm, whether they are an employee, contractor, customer or business partner, and the specific entitlement policies of the organization.

While there are a number of identity management applications available, the applications are proprietary to each vendor and are not intended to integrate with one another. Moreover, the identity management applications are not inherently designed to operate in conjunction with other vendors' SSO applications. Consequently, an enterprise that is interested in a comprehensive application which incorporates single sign on functionality from one vendor with the features of an identity management application from another vendor must either develop a proprietary system or attempt to integrate two or more commercially available applications together. This can be a daunting task for even the most sophisticated enterprise.

There is a need, therefore, for a vendor-agnostic method of integrating single sign on functionality with the features of a robust identity management application in a cost effective, reliable and timely manner.

There is also a need for a method of integrating single sign on applications with identity management applications which reduces the cost and complexity of application development.

There is also a need for a method of restricting user access through a single sign on application that is platform independent, thereby reducing the time, cost and complexity associated with utilizing disparate tools for different platforms.

There is also a need for a method of authenticating user identities that allows developers, designers and system administrators to use languages and concepts with which they are comfortable.

BRIEF SUMMARY OF THE INVENTION

The present invention is for an improved method and system for authenticating user identities on a network. A user accesses the system through a commercially-available single sign on application. When a user requests to be logged in to one or more applications, the request is not sent to a custom business logic layer as known in the art but, instead, is directed to an intermediary application which takes action depending on the nature of the user's login information. The intermediary application is a vendor neutral application that serves as the interface between the single sign on application and the identity management system. The intermediary application contains a work flow or business process engine and a method for mapping the business logic. Information flows seamlessly between the single sign on application and the identity management system without regard to either products' platform or vendor.

These features and advantages, as well as others, will be apparent from the following more detailed description of the preferred embodiments of the invention, as illustrated in the accompanying drawings.

BRIEF DESCRIPTION OF THE DRAWINGS

A better understanding of the system and method of the present invention may be had by reference to the drawings, wherein.

DETAILED DESCRIPTION

The present invention is an improved method and system for identity management integration. The invention may be used in connection with the authentication of users in any type of enterprise. Accordingly, the words "enterprise," "corporation," "company," "venture" and "operation" are used interchangeably herein and can be used to describe private organizations or governmental entities and are not meant to be limiting.

A "user," "consumer" or "subscriber" may be a human user or may be a software process that is configured to access an electronic application.

The term "network" can mean the Internet, a wide area network, a local are network or any other aggregation of more than one computer without regard to the topology of the network, the protocols used in communication on the network, or the method by which devices on the network communicate.

Also, in general the terms "identity" or "identifier" mean a password, account name, personal identification number, biometric identifier, permission level or other attribute identifying or pertaining to the user in some manner.

It is important to note that while the present invention has been and will continue to be described in one embodiment as a system, those skilled in the art will appreciate that the present invention is capable of being distributed as a program product in a variety of forms, and that the present invention applies equally regardless of the particular type of media used to actually carry out the distribution. Examples of suitable media include recordable type media such as CDROM and suitable transmission mechanisms include digital and analog communications links.

The present invention provides a platform-independent model for signing on and authenticating users on a network. When a user requests to be logged in to one or more applications, the request is not sent to a custom business logic layer as known in the art but, instead, is directed to an intermediary application which takes action depending on the nature of the user's login information. The intermediary application is a vendor neutral application that serves as the interface between the single sign on application and the identity management system.

The product resulting from the above approach provides an open, vendor-neutral solution to the obstacle of interoperability between platforms. As new platforms and technologies emerge, it is possible to rapidly integrate those platforms and technologies into the existing system. As a result, the present invention provides a thorough, structured solution for portability into the future.

Figure 1:
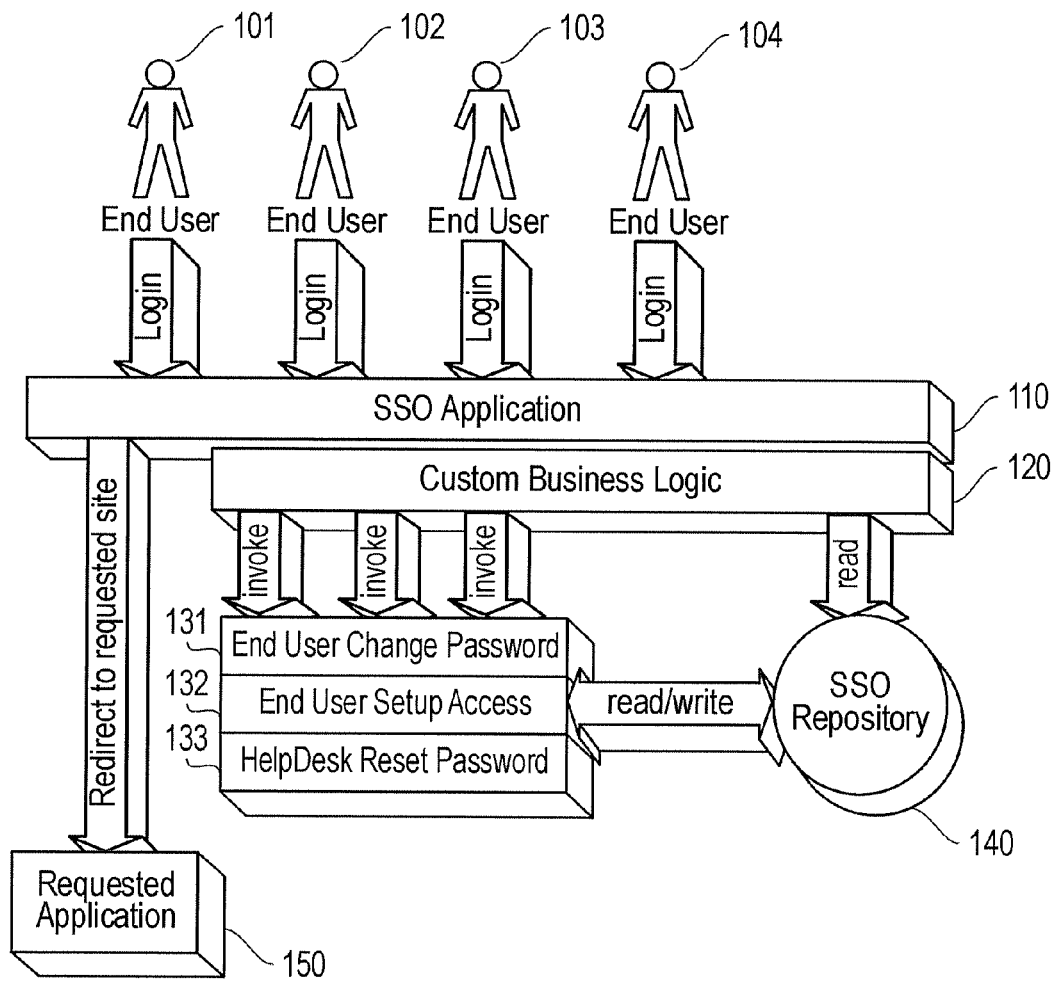
FIG. 1 shows a block diagram depicting the current state of the art.

Referring now to the drawings, FIG. 1 shows a block diagram depicting the current state of the art. In this case, a number of end users 101, 102, 103 and 104 are attempting to access a requested application 150. Although it is transparent to the users 101, 102, 103 and 104, they are not actually signing on to the requested application 150 but rather they are signing on to the single sign on application 110. The single sign on application 110 then directs the users' request through the custom business logic layer 120 to verify that the password exists in the single sign on repository 140 and to assess whether certain changes are required to the users' sign on information, such as changing the users password using the end user change password module 131, allowing the user to setup their account using the end user setup access module 132 or allowing the users password to be changed using the helpdesk reset password module 133. The custom business logic layer 120 may be implemented, for example, by accessing the LDAP to determine whether changes are required to the users' access information. For example, if the end user's password is expired, the custom business logic layer 120 will redirect the user to the end user change password module 131. The user will be redirected to another html page and will be requested to change their password. Once they have entered the new password, the application will automatically update the single sign on repository 140 with the new password.

Once the single sign on application 110 verifies that the users' password is present in the single sign on repository 140, the user will be logged into the requested application 150. It is important to recognize that the single sign on application 110 and the custom business logic layer 120 are predominantly connected through a proprietary interface. Accordingly, it is exceptionally difficult, and commercially infeasible, to aggregate one vendor's single sign on application 110 with another vendor's custom business logic layer 120.

Figure 2:
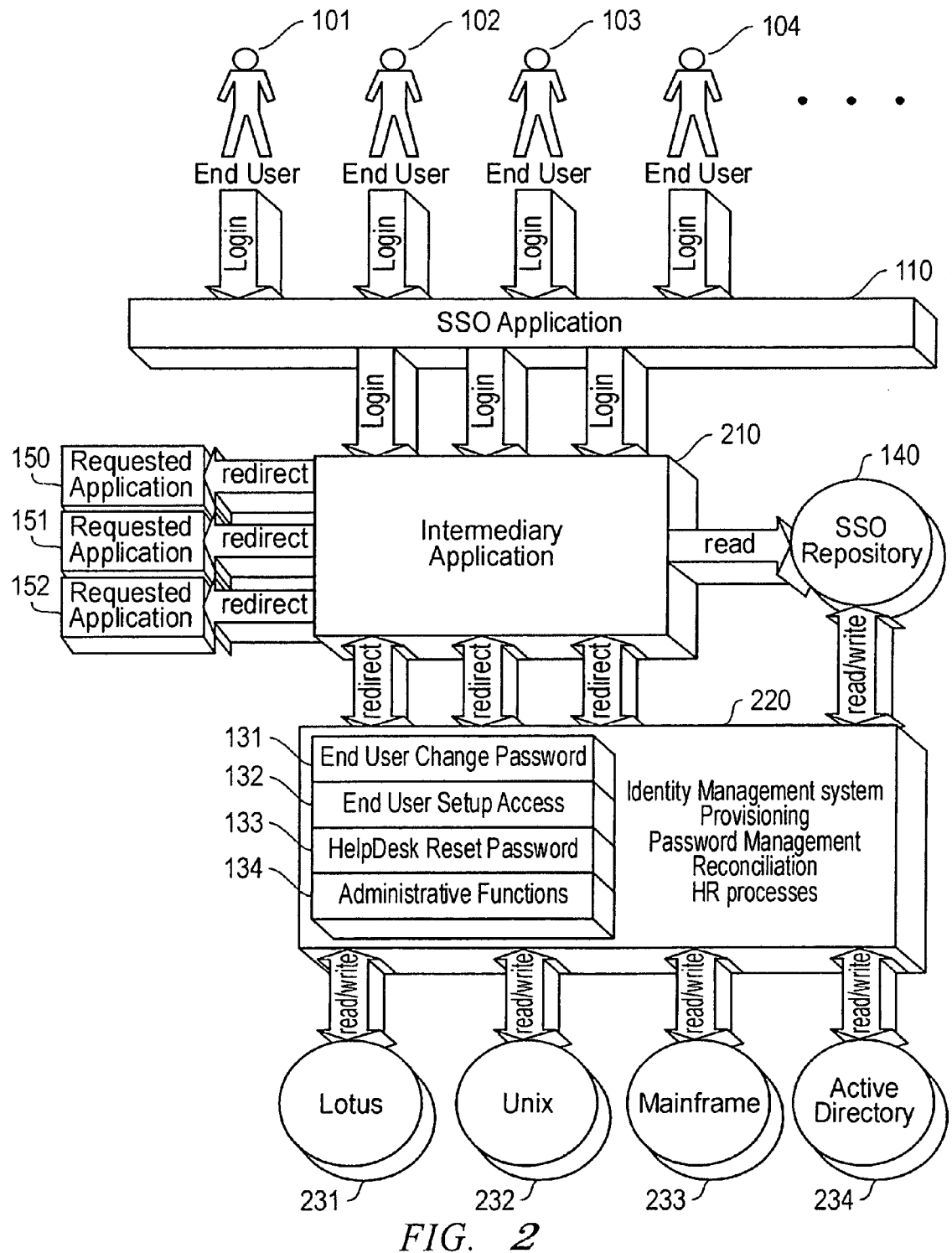
FIG. 2 shows a block diagram depicting one embodiment of the present invention.

FIG. 2 shows a block diagram depicting one embodiment of the present invention. Once again, a number of end users 101, 102, 103 and 104 are attempting to access a requested application 150. Although it is transparent to the users 101, 102, 103 and 104, they are not actually signing on to the requested application 150 but rather they are signing on to the single sign on application 110. In this case, however, when a user requests access to one or more requested applications 150, 151, or 152, the users are not directed to the custom business logic layer 120, but rather are directed to an intermediary application 210. In one embodiment of the invention, the intermediary application 210 contains a work flow or business process engine and a method for mapping the business logic. In other words, instead of the single sign on application 110 accessing a proprietary custom business logic layer 120, it accesses a vendor-neutral intermediary program 210 which is capable of functioning in a wide variety of settings. For example, when a user signs on through the single sign on application 110, the request is directed to the intermediary application 210. The intermediary application 210 recognizes that an identity management system 220 is in place to resolve user authentication and access issues. The request is redirected to the identity management system 220. The identity management system 220 verifies the user's password and authenticates the user. If, for example, the user desires or is required to change their password, the identity management system 220 directs the request to the end user change password module 131. Once the password is changed, the identity management system provides the new password to the single sign on repository 140 and, if necessary, updates the password within other applications, such as Lotus 231, Unix 232, the Mainframe directory 233 and ActiveDirectory 234. Once the identity management system 220 has authenticated the user, the user's request to access one or more requested applications 150, 151, or 152 is processed. It is important to recognize in this embodiment of the invention that there is a clear demarcation between the single sign on application 110 and the identity management system 220, and there is a vendor neutral application that serves as the interface between them.

Figure 3:
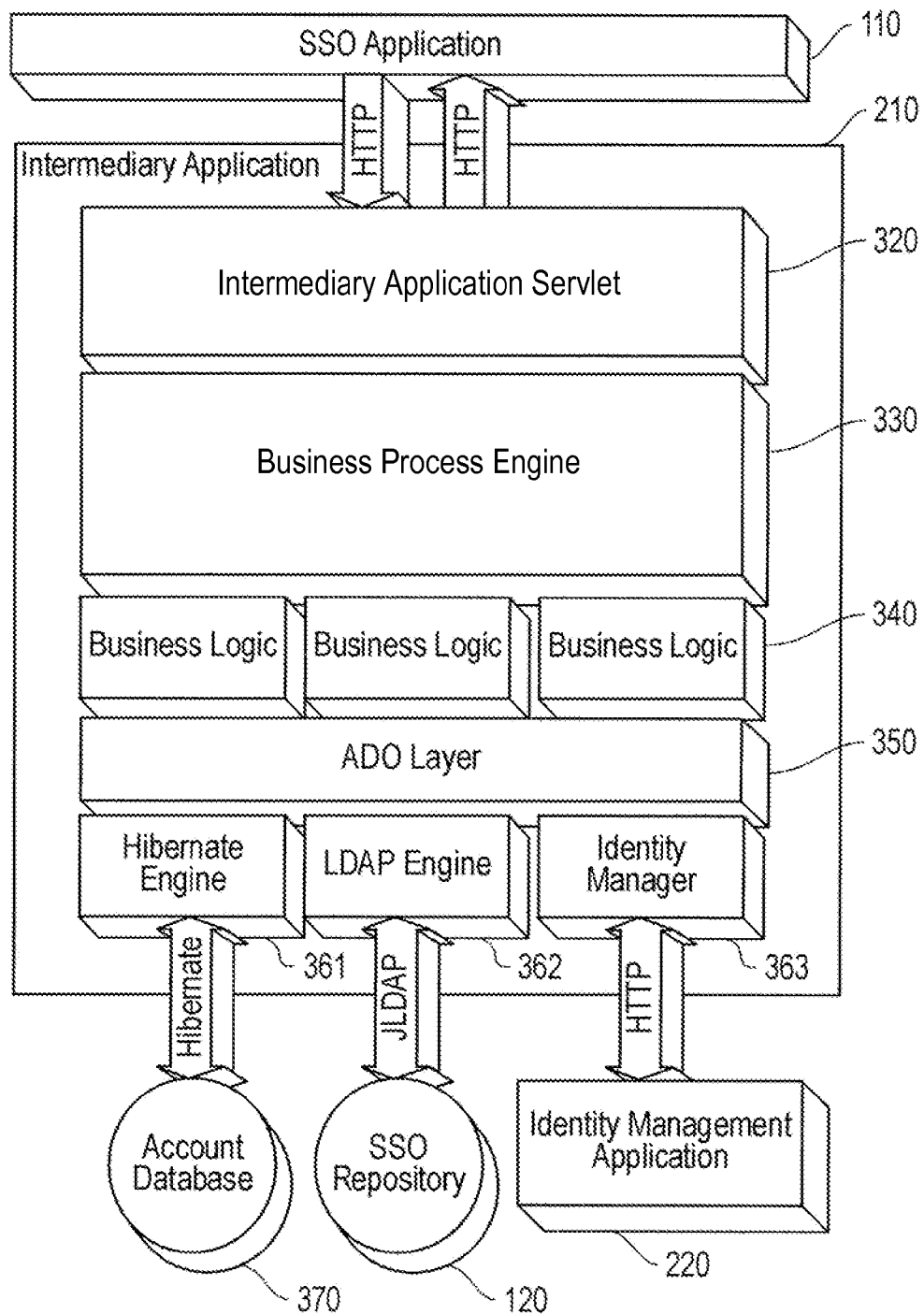
FIG. 3 shows a flow diagram of one embodiment of the method of the present invention.

FIG. 3 shows a flow diagram of one embodiment of the method of the present invention. The single sign on application 110 communicates with the intermediary application servlet 320 using an http interface. Alternatively, the communication may be through an https interface. In one embodiment, the intermediary application servlet 320 is written in the Java programming language. The intermediary application servlet 320 will invoke the business process engine 330 which, in turn, invokes specific business logic queries 340. For example, one business logic query 340 may inquire as to whether the user's password is expired. If the response to the business logic query 340 is true, then an action will be invoked in the ADO layer 350.

For example, if a user's account was locked, the single sign on application 110 would request login. The intermediary application servlet 320 would pass the request to the business process engine 330. The business process engine 330 would process the request through the business logic query 340 which, for example, may redirect the request through the ADO layer 350 to the identity manager application 363. Alternatively, the ADO layer 350 may invoke the LDAP engine 362 to check a user's attributes in the single sign on repository 110. Alternatively, the ADO layer 350 may recognize that a password is locked in which case the ADO layer may invoke the hibernate engine 361 to add data to the account database 370 for the purpose of, for example, tracking the state of the account.

There are numerous additional varieties of single sign on application other than those described herein and there are numerous additional identity management applications available to any organization. The specific single sign on application and identity management applications described herein are not meant to be limiting and are meant only to serve as examples of the types of applications that may be used in connection with the present invention.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible single sign on and application management applications, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for identity management integration comprising:
receiving, by a vendor-neutral intermediary application (VNIA), a user request to access at least one user application from a single sign on (SSO) application, wherein the user request comprises a user identity, and wherein the VNIA comprises an intermediary application servlet, a business process engine, an ActiveX Data Object (ADO) layer, a Lightweight Directory Access Protocol (LDAP) engine, and an identity manager;
recognizing, by the VNIA, an identity management system (IMS) in place;
redirecting, by the VNIA, the user request to the IMS, wherein the IMS authenticates the user request using the user identity; and
processing, by the VNIA in response to the authentication, the user request to access the at least one user application.

2. The method of claim 1 wherein the user application is accessed via one selected from a group consisting of the Internet, a wide area network, and a local area network.

3. The method of claim 1 wherein said user is one selected from a group consisting of a human user and a software process configured to access said network.

4. The method of claim 1 wherein said identity management system verifies a password associated with the user.

5. The method of claim 1 wherein said single sign on application communicates with the VNIA through one selected from a group consisting of a Hypertext Transfer Protocol (http) interface and a Hypertext Transfer Protocol Secure (https) interface.

6. A system for identity management integration comprising:
a single sign on application (SSO) executing on a first computer, configured to generate a user request to access at least one user application, wherein the user request comprises a user identity;
a vendor-neutral intermediary application (VNIA), executing on a second computer, comprising: an intermediary application servlet, a business process engine, an ActiveX Data Object (ADO) layer, a Lightweight Directory Access Protocol (LDAP) engine, and an identity manager, wherein the VNIA is configured to:
receive, from the SSO, the user request;
recognize an identity management system (IMS) in place; and
process the user request to access the at least one user application in response to the IMS authenticating the user request; and
the IMS configured to authenticate the user request using the user identity.

7. The system of claim 6 wherein the user application is accessed via one selected from a group consisting of the Internet, a wide are network, and a local area network.

8. The system of claim 6 wherein said user is one selected from a group consisting of a human user and a software process configured to access said network.

9. The system of claim 6 wherein said identity management application verifies a password associated with the user.

10. The system of claim 6 wherein said single sign on application communicates with the VNIA through one selected from a group consisting of a Hypertext Transfer Protocol (http) interface and a Hypertext Transfer Protocol Secure (https) interface.

11. A non-transitory media comprising software instructions for authenticating users on a network, wherein the software instructions, when executed by a processor, perform a method, the method comprising:
receiving, by a vendor-neutral intermediary application (VNIA), a user request to access at least one user application from a single sign on (SSO) application, wherein the user request comprises a user identity, and
wherein the VNIA comprises an intermediary application servlet, a business process engine, an ActiveX Data Object (ADO) layer, a Lightweight Directory Access Protocol (LDAP) engine, and an identity manager;
recognizing, by the VNIA, an identity management system (IMS) in place;
redirecting, by the VNIA, the user request to the IMS, wherein the IMS authenticates the user request using the user identity; and
processing, by the VNIA in response to the authentication, the user request to access the at least one user application.

12. The non-transitory media of claim 11 wherein the user application is accessed via one selected from a group consisting of the Internet, a wide are network, and a local area network.

13. The non-transitory media of claim 11 wherein said user is one selected from a group consisting of a human user and a software process configured to access said network.

14. The non-transitory media of claim 11 wherein said identity management application verifies a password associated with the user.

15. The non-transitory media of claim 11 wherein said single sign on application communicates with the VNIA through one selected from a group consisting of a Hypertext Transfer Protocol (http) interface and a Hypertext Transfer Protocol Secure (https) interface.

* * * * *